United States Patent
Abraham et al.

(10) Patent No.: US 8,823,587 B2
(45) Date of Patent: Sep. 2, 2014

(54) METHOD OF KEEPING A GPS RECEIVER IN A STATE THAT ENABLES RAPID SIGNAL ACQUISITION

(75) Inventors: Charlie Abraham, Los Gatos, CA (US); Frank van Diggelen, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 113 days.

(21) Appl. No.: 13/173,147

(22) Filed: Jun. 30, 2011

(65) Prior Publication Data
US 2011/0254733 A1    Oct. 20, 2011

Related U.S. Application Data

(63) Continuation-in-part of application No. 13/102,979, filed on May 6, 2011, now Pat. No. 8,310,393, which is a continuation of application No. 12/270,759, filed on Nov. 13, 2008, now Pat. No. 7,948,434.

(51) Int. Cl.
   *G01S 19/27* (2010.01)
   *G01S 19/31* (2010.01)

(52) U.S. Cl.
   USPC ................................ 342/357.66; 342/357.71

(58) Field of Classification Search
   CPC ...... G01S 19/27; G01S 19/258; G01S 5/0263
   USPC ............. 342/357.25, 357.63, 357.66, 357.71, 342/357.74; 701/468, 470
   See application file for complete search history.

(56) References Cited

U.S. PATENT DOCUMENTS

| | | |
|---|---|---|
| 5,511,205 A | 4/1996 | Kannan et al. |
| 5,592,173 A | 1/1997 | Lau et al. |
| 7,148,844 B2 | 12/2006 | Salkhi |
| 7,414,921 B2 | 8/2008 | Gauthey et al. |
| 7,948,434 B2 | 5/2011 | van Diggelen et al. |
| 8,310,393 B2 | 11/2012 | van Diggelen et al. |
| 2006/0149984 A1 | 7/2006 | Yasumoto |
| 2007/0152878 A1 | 7/2007 | Wang et al. |

(Continued)

FOREIGN PATENT DOCUMENTS

TW    200710424 A    3/2007

OTHER PUBLICATIONS

EPO Communication dated Jun. 22, 2011 in Application No. 09013963.5-2220 / 2187228 (four pages).

(Continued)

*Primary Examiner* — Dao Phan
(74) *Attorney, Agent, or Firm* — Sterne, Kessler, Goldstein & Fox, P.L.L.C.

(57) ABSTRACT

Aspects of a method and system for keeping a device for satellite navigation in a state that enables rapid signal acquisition are provided. The device may acquire broadcast ephemeris from one or more satellite signals during a data refresh operation. The satellite signals may comprise a GPS signal, a GLONASS signal, a GALILEO signal, or a combination thereof. The device may compute extended or future ephemeris from the acquired broadcast ephemeris during the data refresh operation. In a positioning operation that is subsequent to the data refresh operation, the device may determine satellite navigation information from the computed extended ephemeris. In some instances, a time associated with a schedule of the data refresh operation may be adjusted based on the computed extended ephemeris. The extended ephemeris may be computed by integrating current and/or historic broadcast ephemeris into an orbit model.

21 Claims, 8 Drawing Sheets

(56) References Cited

U.S. PATENT DOCUMENTS

| | | |
|---|---|---|
| 2007/0159391 A1 | 7/2007 | Kuo et al. |
| 2008/0098246 A1 | 4/2008 | Kim |
| 2008/0117100 A1 | 5/2008 | Wang et al. |
| 2008/0117103 A1 | 5/2008 | Wang et al. |
| 2008/0186228 A1* | 8/2008 | Garin et al. ............ 342/357.12 |
| 2008/0198069 A1 | 8/2008 | Gronemeyer |
| 2010/0321236 A1 | 12/2010 | Diggelen et al. |
| 2013/0009811 A1 | 1/2013 | van Diggelen et al. |

OTHER PUBLICATIONS

Office Action directed to related Taiwanese Patent Application No. 098138561, mailed Apr. 15, 2013; 5 pages.

* cited by examiner

METHOD OF KEEPING A GPS RECEIVER IN A STATE THAT ENABLES RAPID SIGNAL ACQUISITION

CROSS-REFERENCE TO RELATED APPLICATIONS/INCORPORATION BY REFERENCE

The present application is a continuation-in-part of U.S. patent application Ser. No. 13/102,979, filed May 6, 2011, now U.S. Pat. No. 8,310,393, which in turn is a continuation application of U.S. patent application Ser. No. 12/270,759 filed Nov. 13, 2008, now U.S. Pat. No. 7,948,434.

This application also makes reference to U.S. Patent Application Publication No. 2010/0321236 by Van Diggelen et al., filed on Jun. 19, 2009, titled "A Method And System For A GNSS Receiver With Self-Assisted Ephemeris Extensions," now U.S. Pat. No. 8,164,518.

Each of the above stated applications is hereby incorporated by reference in its entirety.

FIELD OF THE INVENTION

Certain embodiments of the invention relate to satellite-based positioning systems. More specifically, certain embodiments of the invention relate to a method and system of keeping a Global Positioning System (GPS) receiver in a state that enables rapid signal acquisition.

BACKGROUND OF THE INVENTION

GPS is a Global Navigation Satellite System (GNSS) that comprises a collection of twenty-four earth-orbiting satellites. Each of the GPS satellites travels in a precise orbit about 11,000 miles above the earth's surface. A GPS receiver locks onto at least three of the satellites to determine its position fix. Each satellite transmits a signal, which is modulated with a unique pseudo-noise (PN) code, at the same frequency. The GPS receiver receives a signal that is a mixture of the transmissions of the various satellites that are visible to the receiver. The GPS receiver can detect the transmission of a particular satellite based on corresponding PN code. For example, the detection may comprise correlating the received signal with shifted versions of the PN code for that satellite to identify the source satellite for the received signal and to achieve synchronization with subsequent transmissions from the identified satellite.

When the GPS receiver is powered up, it typically steps through a sequence of states until it can initially determine a navigation solution comprising position, velocity and time. Afterwards, the satellite signals are tracked recurrently to update the position calculations. Precise orbital information, known as ephemeris or ephemeris data, is transmitted by each satellite for use in calculating the navigation solution. Ephemeris or ephemeris data for a particular satellite may be decoded from orbit data once the GPS signal has been acquired. Each satellite broadcasts its own ephemeris data, the broadcast lasts for 18 seconds, repeating every 30 seconds.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system of keeping a GPS receiver in a state that enables rapid signal acquisition, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system of keeping a GPS receiver in a state that enables rapid signal acquisition. Various aspects of the invention may enable a device for satellite navigation that is operable to acquire broadcast ephemeris from one or more satellite signals during a data refresh operation. The satellite signals may comprise a GPS signal, a GLONASS signal, a GALILEO signal, or a combination thereof. The device may also compute extended ephemeris from the acquired broadcast ephemeris during the data refresh operation. The extended ephemeris may be computed for more than one satellite. The device may dynamically adjust a time associated with a schedule of the data refresh operation based on the computed extended ephemeris. During a positioning operation that is different from the data refresh operation and that may occur subsequent to the data refresh operation, the device may determine satellite navigation information from the computed extended ephemeris.

During the data refresh operation, the computed extended ephemeris may be stored in a memory in the device. The stored computed extended ephemeris may be subsequently read from the memory during the positioning operation. The device may transition from the data refresh operation or from the positioning operation to a low-power mode of the device.

The extended ephemeris may be computed by integrating one or both of current broadcast ephemeris and historic broadcast ephemeris into an orbit model, such as a solar radiation pressure model. In this regard, the device may determine a curve fitting polynomial of the computed extended ephemeris during the data refresh operation and may store the determined curve fitting polynomial in a memory in the device during the data refresh operation.

In another embodiment, the device for satellite navigation may be operable to acquire broadcast ephemeris from one or more satellite signals after transitioning from a sleep state to a wakeup state during a standby mode. The device may correspond to a GNSS-enabled handset or to a portion of a GNSS-enabled handset, for example. The satellite signals may comprise a GPS signal, a GLONASS signal, a GALILEO signal, or a combination thereof. The device may compute extended or future ephemeris from the acquired broadcast ephemeris during the standby mode. After transitioning from the standby mode to a normal mode, the device may determine satellite navigation information from the computed extended ephemeris. In some instances, the time between the sleep state and the wakeup state may be adjusted based on whether the computation of the extended ephemeris is successful.

The extended ephemeris may be computed by integrating current and/or historic broadcast ephemeris into an orbit model, such as a solar radiation pressure model, for example. A curve fitting polynomial of the computed extended ephemeris may be determined and stored in memory to reduce the amount of data storage that may be needed. The extended or future ephemeris may be computed for more than one GNSS satellite during the standby mode.

In some embodiments of the invention, a GNSS-enabled handset may operate in a normal mode and a standby mode. In the standby mode, the GNSS-enabled handset may be configured to switch periodically or aperiodically between a sleep state in the standby mode and a wakeup state in the standby mode. For example, the GNSS-enabled handset in the standby mode may be configured to transition from the sleep state in the standby mode to the wakeup state in the standby mode. In the wakeup state of the standby mode, the GNSS-enabled handset may enable turning on a corresponding GNSS front-end to track satellite signals and acquire fresh navigation information such as fresh ephemeris from the satellite signals. The acquired fresh ephemeris may be stored and may be used for future start-ups of the GNSS-enabled-handset to generate a navigation solution in the normal mode. The acquired fresh ephemeris may also be used to compute or determine ephemeris extensions that may be valid for up to several days. The satellites signals may comprise GPS signals, GALILEO signals, and/or GLONASS signals. The GNSS-enabled handset may operate in various ways. For example, after the start-up for various operations in the normal mode, the GNSS-enabled handset may be configured to return to either the sleep state or the wakeup state from the normal mode, or just stay in the normal mode. A sleep period of the sleep state and a wakeup period of the wakeup state may be predetermined or may be dynamically adjusted. In this regard, when future or extended ephemeris are computed, the period between the sleep state and the wakeup state may be increased since the extended ephemeris may be valid for a longer time than fresh ephemeris. The sleep period and the wakeup period may be determined based on quality of satellite signals and/or user inputs, for example. To generate a navigation solution for the GNSS-enabled handset, the fresh ephemeris may be acquired after the GNSS-enabled handset transitions from the sleep state to the wakeup state during the standby mode. Also, the fresh ephemeris may be utilized during the wakeup state to compute the extended ephemeris. Accordingly, the sleep period may be chosen such that it is less than a period at which the fresh ephemeris is changed by one or more satellites, and the wakeup period may be chosen so that it is long enough to enable collection of the fresh ephemeris and/or the computation of extended ephemeris from fresh ephemeris.

Figure 1:
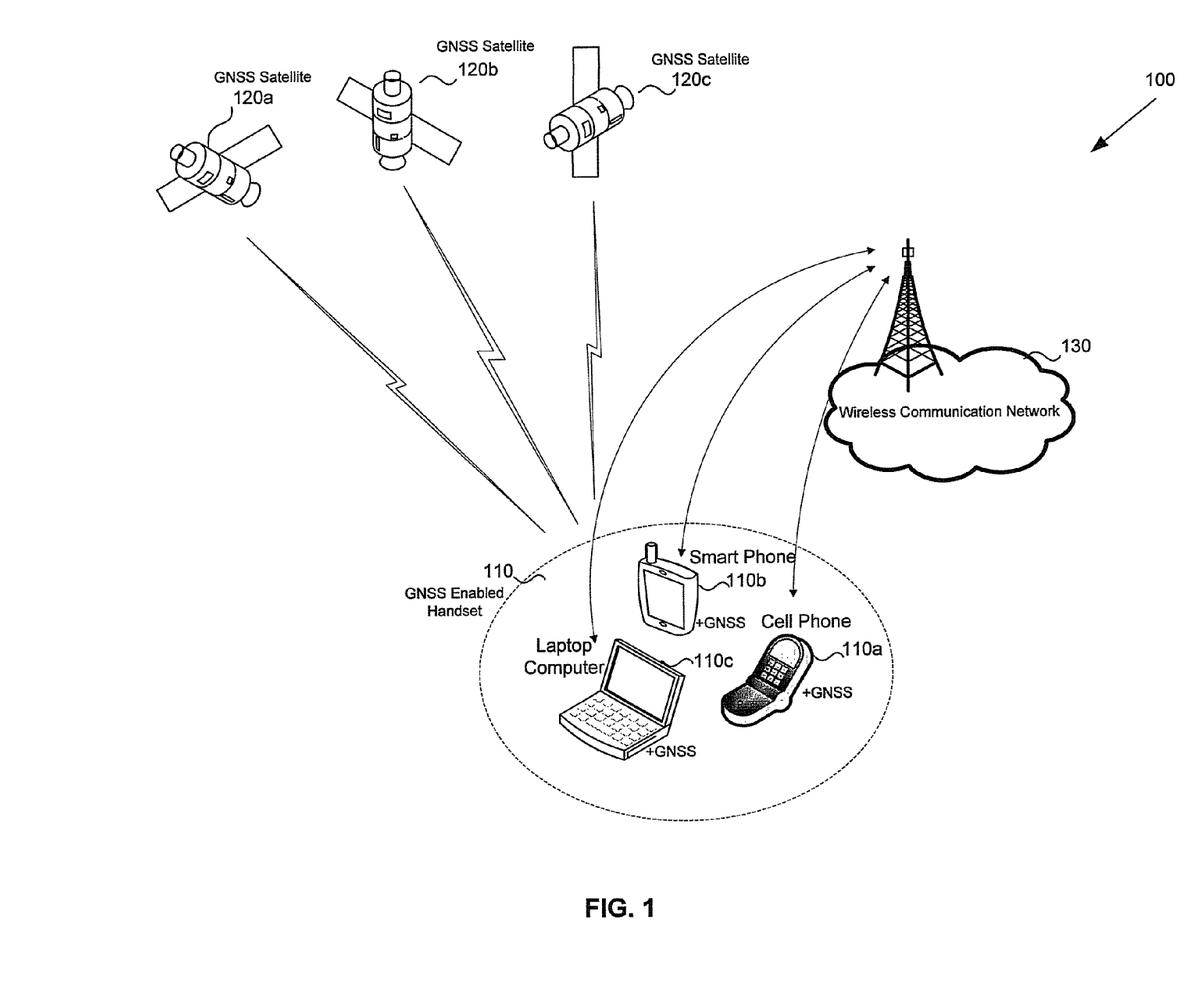
FIG. 1 is a diagram illustrating an exemplary GNSS satellite navigation system, in accordance with an embodiment of the invention.

FIG. 1 is a diagram illustrating an exemplary GNSS satellite navigation system, in accordance with an embodiment of the invention. Referring to FIG. 1, there is shown a GNSS satellite navigation system 100, comprising a GNSS-enabled handset 110, of which a GNSS-enabled cell phone 140a, a GNSS-enabled smartphone 140b, and a GNSS-enabled laptop 140c are presented as examples of such a handset, a plurality of GNSS satellites 120a-120c, and a wireless communication network 130.

The GNSS-enabled handset 110 may comprise suitable logic, circuitry, and/or code that may be operable to receive satellite broadcast signals from the GNSS satellites 120a-120c to determine a position fix or navigational solution of the GNSS-enabled handset 110. The GNSS-enabled handset 110 may be capable of transmitting and/or receiving radio signals via the wireless communication network 130, which may be compliant with, for example, 3GPP, 3GPP2, WiFi, and/or WiMAX communication standards. The GNSS-enabled handset 110 may support various operating modes such as, for example, a normal mode (high power) and a standby mode (low power), to accomplish different tasks during the process of acquiring and maintaining the GNSS information.

An example of a normal mode may be a mode in which the GNSS-enabled handset 110 operates at a normal current consumption level to support its main system processor or central processing unit (CPU) to run all or substantially all main functions normally. In the normal mode, the GNSS-enabled handset 110 may utilize a high speed clock that may consume more power than a low speed clock that may be utilized for the standby mode.

An example of a standby mode may be a mode in which the GNSS-enabled handset 110 operates at a low current consumption level. For example, in the standby mode, the GNSS-enabled handset 110 may operate at a low power level to monitor and activate bus activity. In the standby mode, the GNSS-enabled handset 110 may be configured to turn off main functions that depend on a main system CPU. In this regard, the GNSS-enabled handset 110 in the standby mode may utilize a low frequency clock rather than a high frequency clock that is utilized in the normal mode. In the standby mode, the GNSS-enabled handset 110 may turn off, a least for some time, corresponding radio components required for transmitting and/or receiving data via the wireless communication network 130. However, the GNSS-enabled handset 110 may be operable to turn on or off radio components related to the reception of GNSS data as needed.

In an embodiment, the GNSS-enabled handset 110 in the standby mode may be in one of two states: a wakeup state or a sleep state. The wakeup state may correspond to instances in which the GNSS-enabled handset 110 is in the standby mode and is capable of receiving GNSS data. During this state, the GNSS-enabled handset 110 may be operable to detect and decode the GNSS data, and perform other processing and/or operations on such data. The sleep state may correspond to instances in which the GNSS-enabled handset 110 is in the standby mode and is not capable of receiving GNSS data.

The modes and/or states described above for the GNSS-enabled handset 110 need not be limited. For example, other modes and/or states may be possible in which at least some of the features of the modes and/or states described above may be combined and/or separated.

Depending on the knowledge of the GNSS information such as last GNSS position, current GNSS time and/or ephemeris data, the GNSS-enabled handset 110 may apply different strategies for GNSS start-up, for example, a cold-start, a warm-start, or a hot-start, in acquiring GNSS information. In this regard, in a standby mode, the GNSS-enabled handset 110 may be configured to maintain the GNSS information in a hot-start state by periodically waking up and running long enough to decode fresh ephemeris and/or to compute extended ephemeris from the fresh ephemeris. The decoded fresh ephemeris and/or the extended ephemeris may be used in subsequent startups to improve the time to first fix (TTFF) for the GNSS-enabled handset 110.

The GNSS satellites 120a-120c may comprise suitable logic, circuitry, and/or code that may be enabled to generate and broadcast suitable radio frequency (RF) signals. The broadcast RF signals may comprise navigation information such as orbital information, known as ephemeris or ephemeris data. The orbital information may comprise orbital location as a function of GNSS time. The broadcast ephemeris may change every two hours at the GNSS satellites 120a-120c and may be valid for a particular period of time into the future, for example, four hours. The broadcast ephemeris may be received and decoded by a GNSS satellite receiver, also referred to as a satellite navigation receiver, which may be integrated within the GNSS-enabled handset 110. The broadcast ephemeris may be utilized to determine a navigation solution such as, for example, position, velocity, and clock information of the GNSS-enabled handset 110. The broadcast ephemeris may be utilized to compute an ephemeris extension or extended ephemeris, which may be valid for a period of up to several days. The extended ephemeris may be utilized to determine a navigation solution of the GNSS-enabled handset 110.

The wireless communication network 130 may comprise suitable logic, circuitry and/or code that may be enabled to provide various voice and/or data services via CDMA 2000, WCDMA, GSM, UMTS, WiFi, or WiMAX communication standards.

In operation, the GNSS-enabled handset 110 may be enabled to receive satellite broadcast signals from the GNSS satellites 120a-120c to determine a navigation solution such as a position fix of the GNSS-enabled handset 110. A sequence of states may be executed to acquire and maintain the GNSS navigation information, such as ephemeris, in order to calculate the navigation solution for the GNSS-enabled handset 110. For example, in a standby mode, the GNSS-enabled handset 110 may be enabled to maintain ephemeris in a hot-start state by periodically waking up to acquire GNSS broadcast signals from the GNSS satellites 120a-120c and running long enough to decode ephemeris and/or to compute extended ephemeris. The fresh ephemeris and/or the extended ephemeris may be used in subsequent startups to improve the time to first fix of the GNSS-enabled handset 110. The determined navigation solution may be used for various location based services via the GNSS-enabled handset 110 and/or the wireless communication network 130.

Figure 2A:
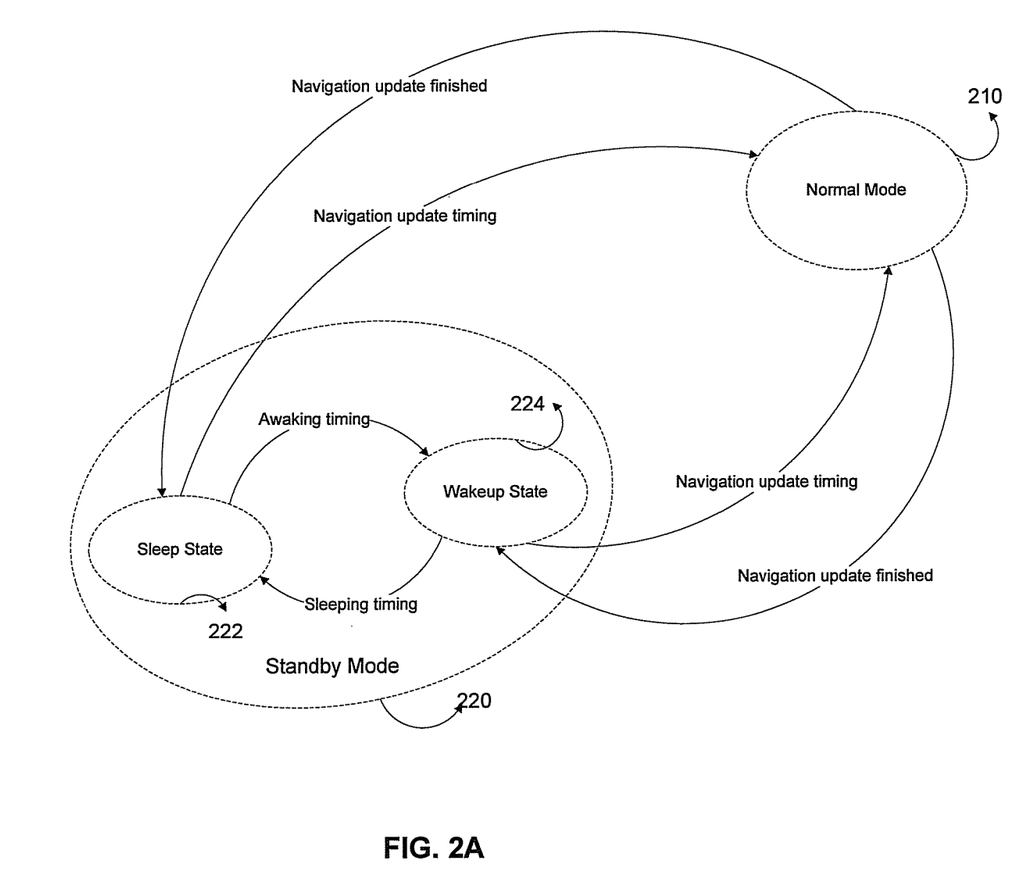
FIG. 2A is a state diagram illustrating an exemplary GNSS receiver operation, in accordance with an embodiment of the invention.

FIG. 2A is a state diagram illustrating an exemplary GNSS receiver operation, in accordance with an embodiment of the invention. Referring to FIG. 2A, there is shown an exemplary operation state machine comprising a normal mode 210 and a standby mode 220. The standby mode 220 may comprise a sleep state 222 and a wakeup state 224.

In the normal mode 210, the GNSS-enabled handset 110 may be fully powered to perform the functions of GNSS signal search, acquisition, measurement and satellite tracking. The period of a full operating cycle for the normal mode 210 may be software adjustable. The GNSS-enabled handset 110 in the normal mode 210 may output position information at a user-defined rate. Depending on implementation, the GNSS-enabled handset 110 may be configured to switch automatically between the standby mode 220 and the normal mode 210 to save power, or just stay in the normal mode after being switched from the standby mode.

In the standby mode 220, the GNSS-enabled handset 110 may be operating at minimal or reduced power, which may be significantly less than the amount of power used in the normal mode 210. In this regard, in the standby mode 220, the GNSS-enabled handset 110 may be configured in the sleep state 222 or in the wakeup state 224. In the sleep state 222, the GNSS-enabled handset 110 may be configured to turn off the GNSS RF components to reduce power consumption.

The GNSS-enabled handset 110 may be configured to periodically wake up and enter the wakeup state 224 from the sleep state 222 to acquire fresh ephemeris and/or to compute extended ephemeris based on the fresh ephemeris. The ephemeris may change every two hours at satellites such as the GNSS satellites 120a-120c, and may be good for four hours. An appropriate wake up interval of, for example, every two hours, may be utilized. The extended ephemeris may be valid for long periods of time, sometimes up to several days. In instances in which the extended ephemeris is available, the appropriate wake up interval may be adjusted to be longer than every two hours, for example. In the wakeup state 224, the GNSS-enabled handset 110 may acquire ephemeris, compute extended ephemeris, and/or maintain GNSS navigation information without being fully powered. For example, the GNSS-enabled handset 110 may wake up without even turning on user interface components such as the display.

During the wakeup state 224, the GNSS-enabled handset 110 may stay on long enough to acquire a complete ephemeris and/or to compute the extended ephemeris. The GNSS-enabled handset 110 may consume a small amount of battery power for various operations during the wakeup state 224. The GNSS-enabled handset 110 may store the acquired ephemeris data and/or the computed extended ephemeris data such that a subsequent GNSS start-up may calculate a navigation solution or perform navigation update in the normal mode 210. The GNSS-enabled handset 110 may return to the sleep state 222 or the wakeup state 224 in the standby mode 220 after the navigation update. Depending on implementation, the GNSS-enabled handset 110 may stay in the normal mode after the navigation update. The period of a full sleep-wakeup cycle in the standby mode may be software adjustable via various timing control. For example, the GNSS-enabled handset 110 may be configured via setting up a wakeup timer and/or a sleep timer for updating navigation information of the GNSS-enabled handset 110. The wakeup timer and/or the sleep timer may be pre-determined and/or may be dynamically adjusted depending on, for example, required QoS, quality of the acquired ephemeris data, and/or the expected validity duration of the computed extended ephemeris.

Figure 2B:
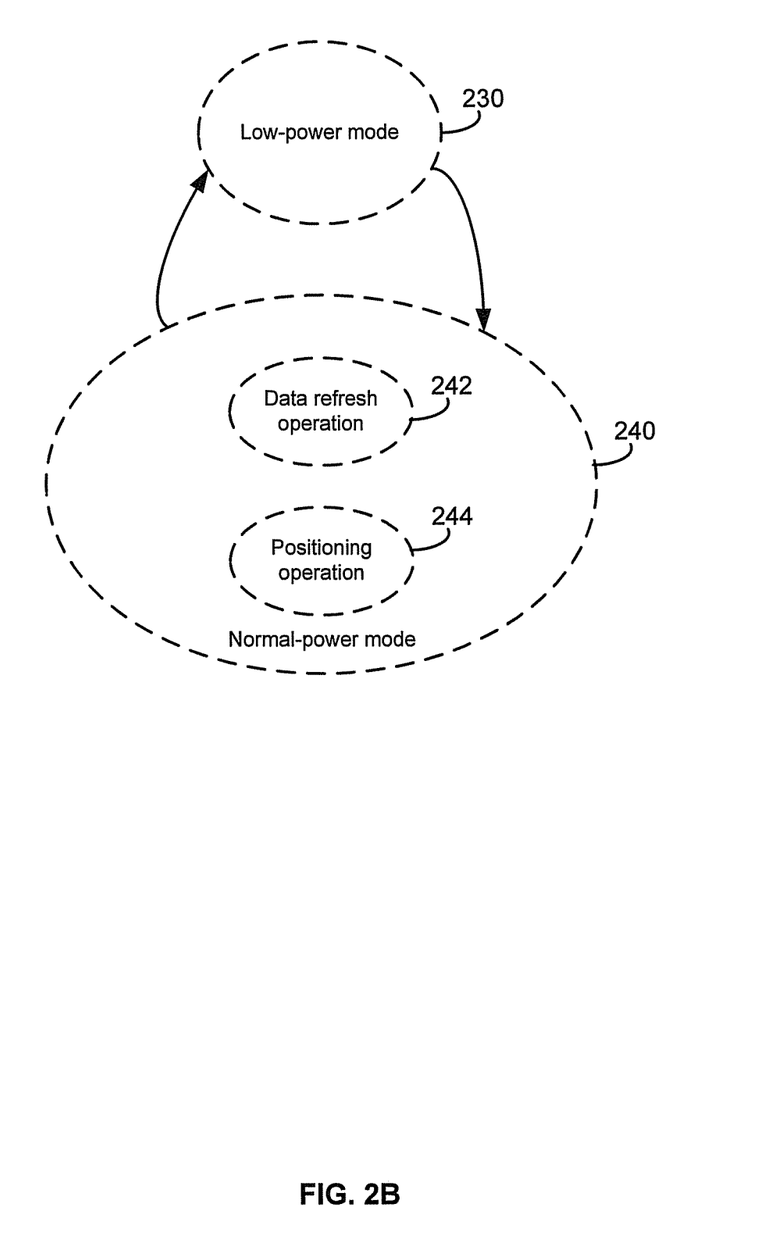
FIG. 2B is a state diagram illustrating another example of a GNSS receiver operation, in accordance with an embodiment of the invention.

FIG. 2B is a state diagram illustrating another example of a GNSS receiver operation, in accordance with an embodiment of the invention. Referring to FIG. 2B, there is shown a low-power mode 230 and a normal-power mode 240. The low-power mode 230 may refer to a mode in which at least a portion of the functionality of the GNSS-enabled handset 110 may be turned off to reduce power consumption. In this regard, the low-power mode 230 may be substantially similar to the standby mode 220 described above with respect to FIG. 2A. The low-power mode 230 may be utilized to keep various types of satellite and navigation data and/or time while powering down some functions that are typically used to compute position.

The normal-power mode 240 may refer to a mode in which substantially all or all of the functionality of the GNSS-enabled handset 110 may be turned on and available for use. In this regard, the normal-power mode 240 may be substantially similar to the normal mode 210 described above with respect to FIG. 2A.

The normal-power mode 240 may support a data refresh operation 242 and a positioning operation 244. The data refresh operation 242 is an operation in which satellite data may be refreshed. The data refresh operation 242 may be performed multiple times and/or in accordance with a schedule. The data refresh operation 242 may comprise some or all of the functionality described above in connection with the wakeup 224. For example, during the data refresh operation 242, the GNSS-enabled handset 110 may acquire ephemeris, compute extended ephemeris, and/or maintain GNSS navigation information. The timing associated with the schedule of the data refresh operation 242 may be dynamically adjusted based on one or more of the data acquired and computed by the GNSS-enabled handset 110. The data refresh operation 242 may be performed independently of whether the positioning operation 244 is needed.

The positioning operation 244 may be performed multiple times and/or in accordance with a schedule and/or certain events. The positioning operation 244 may be utilized to calculate a navigation solution or perform navigation update. In some instances, the GNSS-enabled handset 110 may perform the data refresh operation 242 one or more times before the positioning operation 244 is performed.

The GNSS-enabled handset 110 may transition from the data refresh operation 242 or from the positioning operation 244 to the low-power mode 230. In this regard, the GNSS-enabled handset 110 may transition from the low-power mode 230 to the normal-power mode 240 and from the normal-power mode 240 to the low-power mode 230.

The functionality and/or components that are powered on and running during one or more operations in the normal-power mode 240 may be substantially the same. For example, the functionality and/or components that are powered on and running during the data refresh operation 242 and the positioning operation 244 may be substantially the same.

Figure 3:
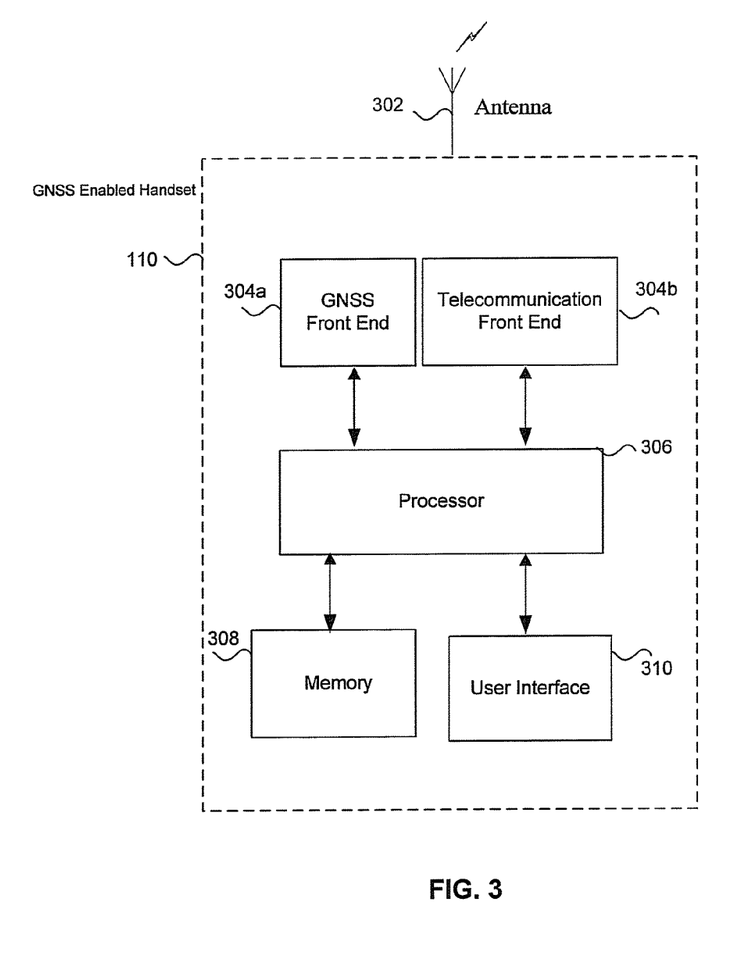
FIG. 3 is a diagram illustrating an exemplary GNSS-enabled device comprising a GNSS receiver, in accordance with an embodiment of the invention.

FIG. 3 is a diagram illustrating an exemplary GNSS-enabled device comprising a GNSS receiver, in accordance with an embodiment of the invention. Referring to FIG. 3, there is shown the GNSS-enabled handset 110 comprising an antenna 302, a GNSS front-end 304a, a telecommunication front-end 304b, a processor 306, a memory 308, and a user interface 310.

The antenna 302 may comprise suitable logic, circuitry and/or code that may be enabled to receive L band signals from the plurality of GNSS satellites 120a-120c. The antenna 302 may enable transmission and/or reception of radio signals via, for example, a 3G radio communication system, for communications among 3G devices.

The GNSS front-end 304a may comprise suitable logic, circuitry and/or code that may be enabled to receive GNSS satellite broadcast signals via the antenna 302 and convert them to GNSS baseband signals for further baseband signal processing in the processor 306.

The telecommunication front-end 304b may comprise suitable logic, circuitry and/or code that may be enabled to transmit and/or receive RF signals via a telecommunication network such as the wireless communication network 130 using the antenna 302. The telecommunication front-end 304b may enable conversion of the received RF signals to corresponding baseband signals for further baseband signal processing in the processor 306.

The processor 306 may comprise suitable logic, circuitry and/or code that may be enabled to process received satellite signals as well as signals received from the wireless communication network 130. The processor 306 may be configured to extract navigational information from received satellite signals. The processor 306 may be operable to process the navigational information after it is extracted. The extracted navigational information and/or the processed extracted navigational information may be utilized to determine, for example, a position fix for the GNSS-enabled handset 110. The processor 306 may be programmed to turn on or off the GNSS front-end 304a. For example, the processor 306 may periodically or aperiodically enter the standby mode 220 in which the GNSS front-end 304a is turned on and information such as ephemeris from the GNSS satellites 120a-120c may be received. The processor 306 may enable the GNSS-enabled handset 110 to operate by consuming a minimal or reduced amount of power during the wakeup state 224. For example, in the standby mode 220, the processor 306 may periodically or aperiodically wake up the GNSS front-end 304a for receiving GNSS signals, extract, process, and store information such as ephemeris and/or extended ephemeris from the received GNSS signals without even turning on the display or other circuitry in the GNSS-enabled handset 110 that is not required to enable receiving of the information. In instances when a navigation update may be required, for example, via the user interface 310 or via any one of various upper layer applications from the wireless communication network 130, the processor 306 may provide the fresh ephemeris and/or the extended ephemeris stored in the memory 308 for use.

The memory 308 may comprise suitable logic, circuitry, and/or code that may enable storing of information such as executable instructions and data that may be utilized by the processor 306. The executable instructions may comprise algorithms that may be applied to extract ephemeris from received GNSS broadcast navigation signals and to calculate a navigation solution from the extracted ephemeris. The executable instructions may comprise algorithms that may be applied to compute the future or extended ephemeris and/or to further process the computed extended ephemeris. The data may comprise GNSS navigation information such as the extracted fresh ephemeris. The memory 308 may comprise RAM, ROM, low latency nonvolatile memory such as flash memory and/or other suitable electronic data storage.

The user interface 310 may comprise suitable logic, circuitry, and/or code that may enable presentation of navigation information. The navigation information may be presented graphically, aurally, in response to user input requests for a navigation update via, for example, a keyboard, a keypad, a thumbwheel, a mouse, touchscreen, audio, a trackball and/or other input method.

In operation, a plurality of radio signals may be received at the antenna 302 coupled to the GNSS-enabled handset 110. The received plurality of radio signals may be communicated to the GNSS front-end 304a or the telecommunication front-end 304b, respectively, depending on the type of received radio signals. When the GNSS-enabled handset 110 may be in the standby mode 220, the processor 306 may be enabled to switch the GNSS-enabled handset 110 between the sleep state 222 and the wakeup state 224 to save power. The wakeup state 224 may allow the processor 306 to wake up the GNSS front-end 304a for receiving GNSS signals and to acquire navigation information such as ephemeris from the GNSS satellites 120a-120c by using a small amount of power. In the wakeup state 224, the processor 306 may be enabled to extract complete ephemeris from the received GNSS signals, and store the extracted ephemeris in the memory 308, accordingly. In the wakeup state 224, the processor 306 may be operable to compute extended ephemeris based on the extracted ephemeris and/or to process the computed extended ephemeris before storage in the memory 308. Various operations such as, for example, acquiring fresh navigation information from the satellite signals in the wakeup state 224 may be executed without even turning on the user interface 310 to save power. When a navigation update may be needed, the processor 306 may use the latest ephemeris stored in the memory 308 to generate a navigation solution.

The various components of the GNSS-enabled handset 110 described in FIG. 3 may also be utilized to support modes and/or states that may be different from those described in FIG. 2A. For example, the various components of the GNSS-enabled handset 110 may be operated in the low-power mode 230 and in the normal-power mode 240 described in FIG. 2B. Moreover, the various components of the GNSS-enabled handset 110 may be utilized to perform the data refresh operation 242 and/or the position operation 244 also described in connection with FIG. 2B.

Figure 4:
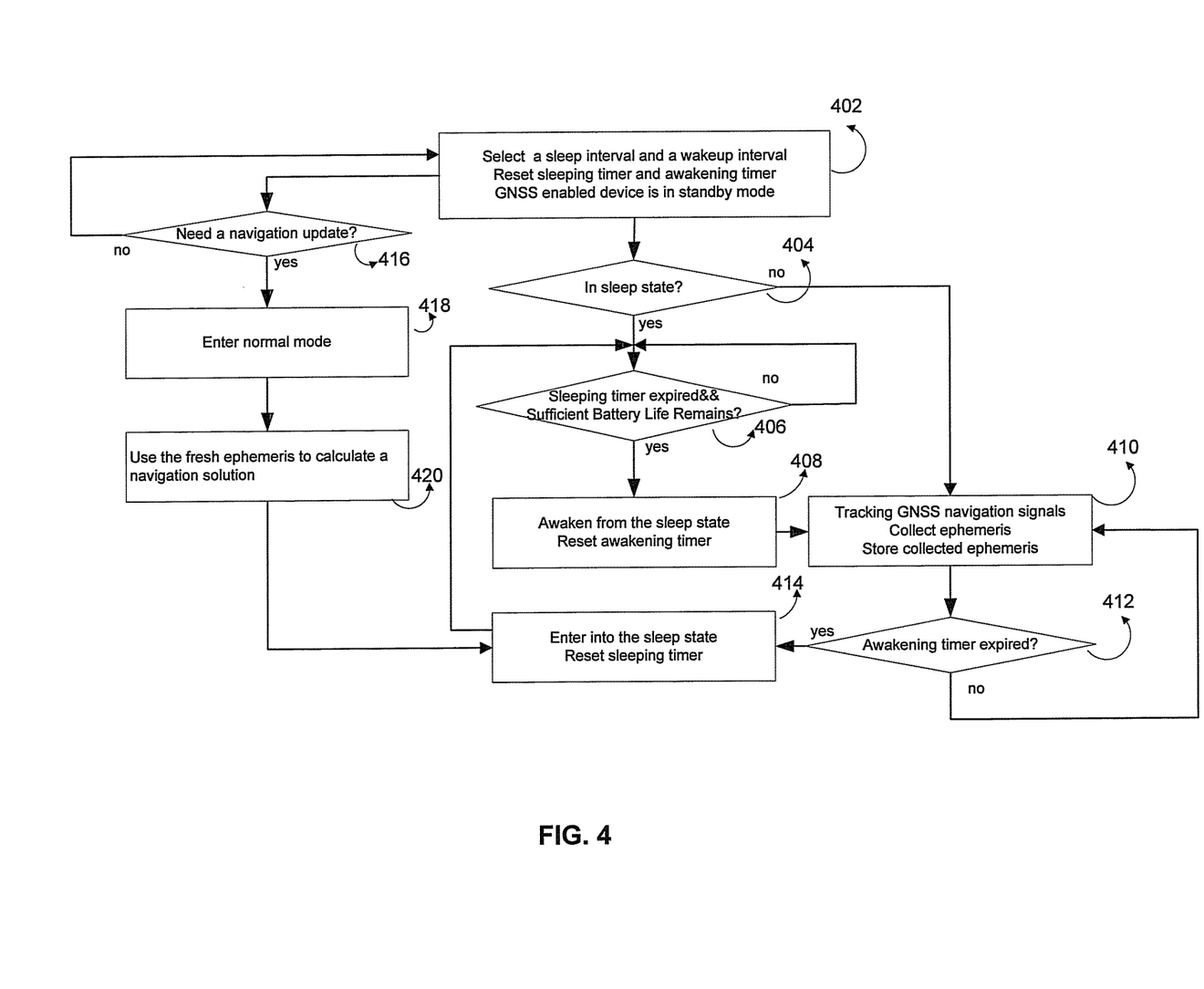
FIG. 4 is a flow chart illustrating exemplary steps for maintaining a GNSS receiver in a hot-start state, in accordance with an embodiment of the invention.

FIG. 4 is a flow chart illustrating exemplary steps for maintaining a GNSS receiver in a hot-start state, in accordance with an embodiment of the invention. Referring to FIG. 4, the exemplary steps start with the step 402. It is assumed that the GNSS-enabled handset 110 may start in the standby mode 220. In step 402, the GNSS-enabled handset 110 may select a sleep interval and a wake-up interval. The sleep interval and the wakeup interval may be predetermined or dynamically adjusted based on one or more factors comprising QoS, quality of the satellite signals, battery life, user input, and/or availability of valid extended ephemeris. In addition, a sleep timer and a wakeup timer may be reset. The sleep timer and the wakeup timer may be used for timing control of the full sleep-wakeup cycle.

In step 404, it may be determined whether the GNSS-enabled handset 110 may be in the sleep state 222. In instances where the GNSS-enabled handset 110 may be in the sleep state 222, then, in step 406, it may be determined whether the sleep timer has expired and there may be sufficient battery life remained. In instances where the sleep timer may expire, then in step 408, the GNSS-enabled handset 110 may wake up from the sleep state 224 and reset the awakening timer. In step 410, the GNSS-enabled handset 110 may acquire GNSS navigation signals, acquire/decode a complete ephemeris from acquired GNSS navigation signals, store the fresh ephemeris into the memory 308, compute extended ephemeris from the fresh ephemeris, and/or store the computed extended ephemeris into the memory 308. In step 412, determine if the wake up timer has expired, in instances where the wakeup timer may expire, then in step 414, the GNSS-enabled handset 110 may enter into the sleep state 222 and reset the sleep timer, then return to the step 406. In step 404, in instances where the GNSS-enabled handset 110 may not be in the sleep state 222, the next step is step 410.

In step 406, in instances where the sleep timer has not expired and/or there may be no sufficient battery life remained, and then execution remains in step 406. In step 412, in instances where the wakeup timer has not expired, then the next step is step 410. The GNSS-enabled handset 110 may be switched from the standby mode 220 (step 402) to the normal mode 210 for a navigation update. In step 416, it may be determined whether a navigation update is requested. In instances where the GNSS-enabled handset 110 may request navigation information, then in step 418, the GNSS-enabled handset 110 may enter the normal mode 210. In step 420, the processor 306 may access the memory 308 for the fresh ephemeris and/or for extended ephemeris to determine the requested navigation information. The GNSS-enabled handset 110 may then enter the sleep state 222. Depending on implementation and/or QoS requirements, the GNSS-enabled handset 110 may be configured to return to the wakeup state 224 in the standby mode from the normal mode 210, or stay in the normal mode 210 after performing the navigation solution.

Figure 5:
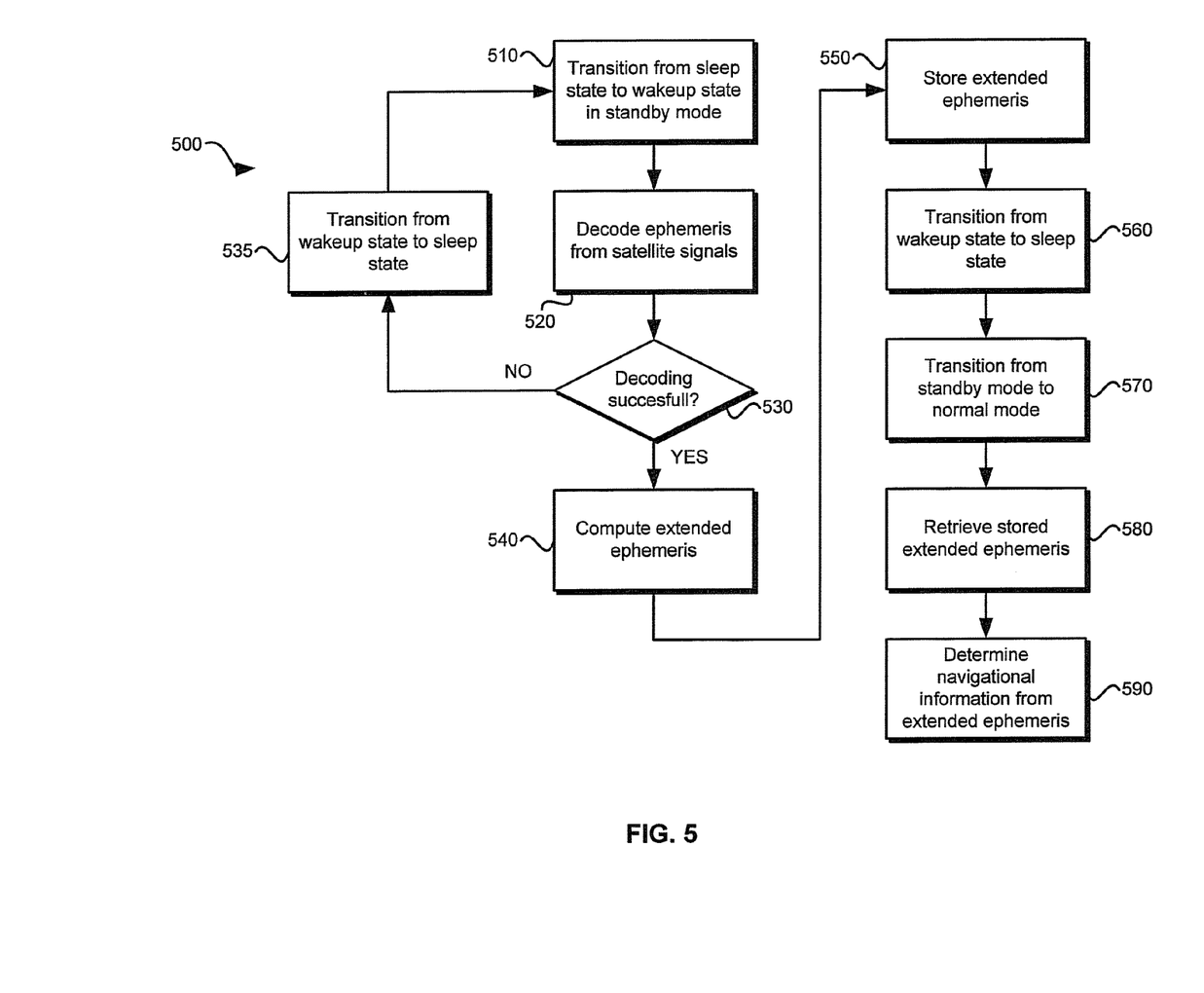
FIG. 5 is a flow chart illustrating exemplary steps for computing extended ephemeris during a standby mode, in accordance with an embodiment of the invention.

FIG. 5 is a flow chart illustrating exemplary steps for computing extended ephemeris during a standby mode, in accordance with an embodiment of the invention. Referring to FIG. 5, there is shown a flow chart 500 in which at step 510, a GNSS device may transition form a sleep state, such as the sleep state 222, to a wakeup state, such as the wakeup state 224. The GNSS device may correspond to the GNSS-enabled handset 110 or to one or more components of the GNSS-enabled handset 110. For example, the GNSS device may comprise the portions of the GNSS-enabled handset 110 that support the operations of the sleep state 222 and the wakeup state 224.

At step 520, the GNSS device may begin the extraction and decoding of fresh or current ephemeris from satellite signals. At step 530, when the ephemeris decoding has been successful, the GNSS device may store the ephemeris in memory, such as the memory 308, and the process may proceed to step 540. When the ephemeris decoding in step 530 is unsuccessful during the allocated wakeup state time, the process may proceed to step 535 in which the GNSS device may transition back to the sleep state.

At step 540, the extracted ephemeris may be utilized to compute an ephemeris extension or extended ephemeris that may be valid for a longer time. The extended ephemeris may be stored in memory, such as the memory 308, during step 550. At step 560, the GNSS device may transition from the wakeup state to the sleep state. At step 570, the GNSS device may transition from a standby mode, such as the standby mode 220, to a normal mode, such as the normal mode 210. In this regard, the GNSS device may transition to the normal mode from the standard mode without having to first transition to the sleep state as illustrated in step 560.

At step 580, the extended ephemeris and/or other stored information may be retrieved from memory during the normal mode. At step 590, a processor, such as the processor 306, for example, may determine or compute navigational information from the extended ephemeris and/of other information retrieved from memory.

The GNSS device may be operable to extract broadcast ephemeris from received GNSS signals to generate ephemeris extensions comprising future ephemeris for the next several days for each of a plurality of GNSS satellites in view. The generated future ephemeris may be utilized to determine a position fix of the GNSS device even without the GNSS device receiving and/or completely receiving fresh broadcast ephemeris from the plurality of visible GNSS satellites.

The GNSS device may be operable to schedule the generation of ephemeris extensions (future ephemeris) for each of the plurality of visible GNSS satellites according to various factors such as, for example, the age of available ephemeris extensions and/or the time of visibility of related GNSS satellites. Future ephemeris may be generated for each of visible GNSS satellites by integrating available ephemeris such as present or historic broadcast ephemeris into an orbit model such as solar radiation pressure model. Various numerical integration methods such as the multi-step numerical integration method may be used to determine associated orbit model parameters. The resulting orbit model may be used to propagate the available ephemeris of related GNSS satellites for the generation of corresponding future ephemeris. The generated future ephemeris may be reformatted into a desired model or format that may be suitable for use by the GNSS device. The generated future ephemeris may be curve fitted to determine a curve fitting polynomial for each of the visible GNSS satellites. Instead of actual generated future ephemeris, the determined curve fitting polynomial may be stored in memory, such as the memory 308, in the GNSS device to conserve storage space.

Information regarding the computation, processing, and/or handling of ephemeris extensions is described in more detail in U.S. Patent Application Publication No. 2010/0321236 by Van Diggelen et al., which is titled "A Method And System For A GNSS Receiver With Self-Assisted Ephemeris Extensions," now U.S. Pat. No. 8,164,518, the contents of which are incorporated herein by reference in their entirety.

Figure 6:
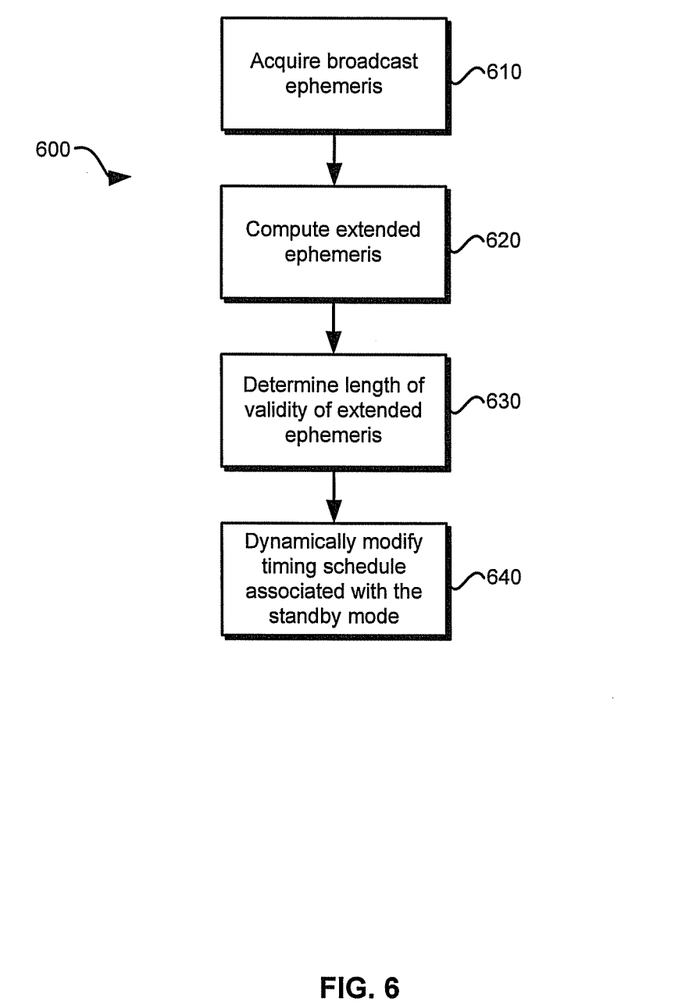
FIG. 6 is a flow chart illustrating exemplary steps for modifying the standby mode operation of a GNSS device based on computed extended ephemeris, in accordance with an embodiment of the invention.

FIG. 6 is a flow chart illustrating exemplary steps for modifying the standby mode operation of a GNSS device with computed extended ephemeris, in accordance with an embodiment of the invention. Referring to FIG. 6, there is shown a flow chart 600 in which at step 610, a GNSS device, such as the GNSS-enabled handset 110, for example, may acquire broadcast ephemeris from one or more satellite signals during a wakeup state in a standby mode. At step 620, during the wakeup state, the GNSS device may utilize the broadcast ephemeris and/or historic broadcast ephemeris previously stored in memory to compute extended ephemeris. At step 630, the GNSS device may determine, based on the calculations performed, an approximate duration of validity of the computed extended ephemeris. The duration of validity may be different for different accuracy levels and the GNSS device may be operable to select from among various durations based on a certain accuracy level. For example, the duration of validity of the extended ephemeris may range from 4 hours to several days and the GNSS device may select a value in between according to some predetermined accuracy value.

At step 640, based on the duration of validity of the extended ephemeris, the GNSS device may dynamically modify the timing schedule associated with the standby mode. For example, when the extended ephemeris is valid for several days, the time between wakeup states may be increased significantly from the time used when the GNSS device relied solely on fresh ephemeris, which is valid for about four hours. When the time between wakeup states is increased, the amount of power that is utilized by the GNSS device during the standby mode may be reduced.

Figure 7:
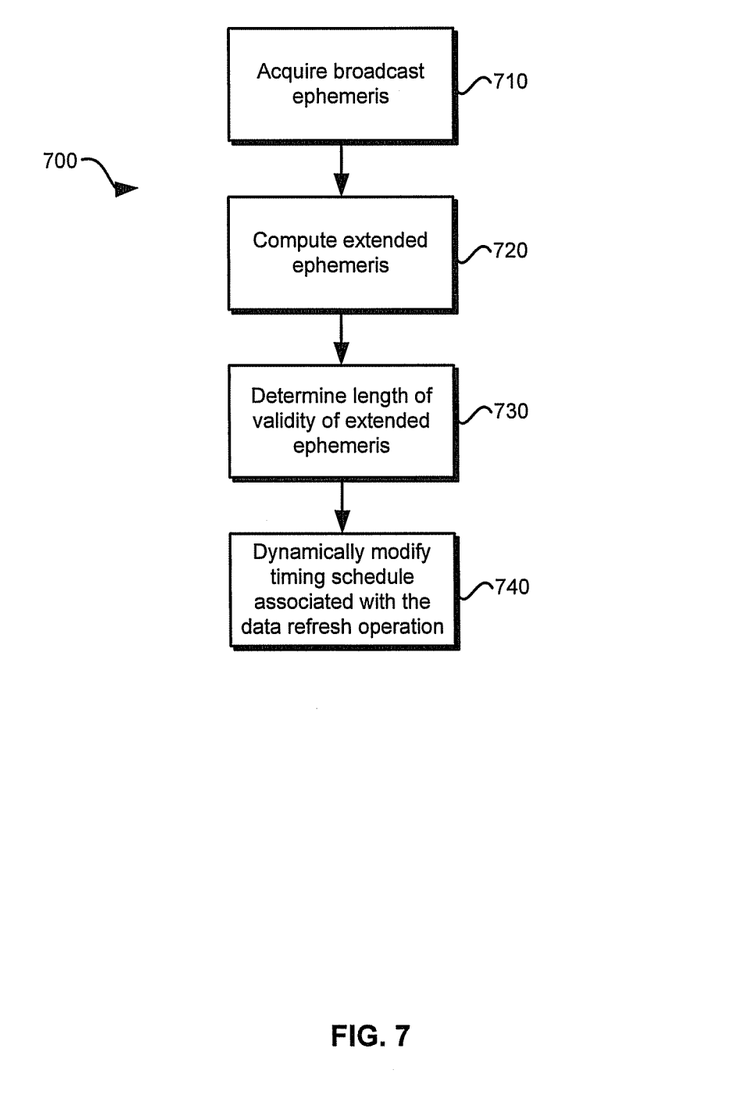
FIG. 7 is a flow chart illustrating exemplary steps of operation of a GNSS device based on computed extended ephemeris, in accordance with an embodiment of the invention.

FIG. 7 is a flow chart illustrating exemplary steps of operation of a GNSS device based on computed extended ephemeris, in accordance with an embodiment of the invention. Referring to FIG. 7, there is shown a flow chart 700 in which at step 710, a GNSS device, such as the GNSS-enabled handset 110, for example, may acquire broadcast ephemeris from one or more satellite signals during a data refresh operation in a normal-power mode. At step 720, during the data refresh operation, the GNSS device may utilize the broadcast ephemeris and/or historic broadcast ephemeris previously stored in memory to compute extended ephemeris. At step 730, the GNSS device may determine, based on the calculations performed, an approximate duration of validity of the computed extended ephemeris. The duration of validity may be different for different accuracy levels and the GNSS device may be operable to select from among various durations based on a certain accuracy level. For example, the duration of validity of the extended ephemeris may range from 4 hours to several days and the GNSS device may select a value in between according to some predetermined accuracy value.

At step 740, based on the duration of validity of the extended ephemeris, the GNSS device may dynamically modify the timing schedule associated with the data refresh operation. For example, when the extended ephemeris is valid for several days, the time between data refresh operations may be increased significantly from the time used when the GNSS device relied solely on fresh ephemeris, which is valid for about four hours.

In some embodiments of the invention, a device that is operable for satellite navigation, such as the GNSS-enabled handset 110, for example, may be operable to acquire broadcast ephemeris from one or more satellite signals after transitioning from a sleep state (e.g., sleep state 222) to a wakeup state (e.g., wakeup state 224) during a standby mode (e.g., standby mode 220). The one or more satellite signals may comprise a GPS signal, a GLONASS signal, a GALILEO signal, or a combination thereof. The device may compute extended ephemeris from the acquired broadcast ephemeris during the standby mode and may determine satellite navigation information, such as position fix, for example, from the computed extended ephemeris after transitioning from the standby mode to a normal mode (e.g., normal mode 210).

The device may dynamically adjust a time between the sleep state and the wakeup state based on whether the computation of the extended ephemeris is successful. For example, when the device is unable to decode the ephemeris in the time allocated for the wakeup state, the extended ephemeris may not be computed and the time or schedule between the sleep state and the wakeup state need not be modified. When the device is able to decode the ephemeris in the time allocated for the wakeup sate, the extended ephemeris may be computed and the time or schedule between the sleep state and the wakeup state may be modified to account for the availability of the extended ephemeris.

The device may compute the extended ephemeris using a processor such as the processor 306, for example. The extended ephemeris may be computed for more than one GNSS satellite, such as the plurality of GNSS satellites 120a-120c, for example. The extended ephemeris may be computed by integrating one or both of current or fresh broadcast ephemeris and historic broadcast ephemeris into an orbit model, such as a solar radiation pressure model, for example. Moreover, a curve fitting polynomial of the computed extended ephemeris may be determined during the standby mode and the determined curve fitting polynomial may be stored in the memory 308 during the same mode.

After the acquisition of the ephemeris and the computation of the extended ephemeris, the device may transition back to the sleep state from the wakeup state. The computed extended ephemeris may be stored in a memory in the device, such as the memory 308 in the GNSS-enabled handset 110, during the standby mode. The stored computed extended ephemeris may be read or retrieved from the memory during the normal mode. While in the normal mode, the device may remain in that mode or may transition to the sleep state in the standby mode.

Various aspects of the invention may enable a device for satellite navigation, such as the GNSS-enabled handset 110, for example, to acquire broadcast ephemeris from one or more satellite signals during the data refresh operation (e.g., data refresh operation 242). The satellite signals may comprise a GPS signal, a GLONASS signal, a GALILEO signal, or a combination thereof. The device may also compute extended ephemeris from the acquired broadcast ephemeris during the data refresh operation. The extended ephemeris may be computed for more than one satellite. The device may dynamically adjust a time associated with a schedule of the data refresh operation based on the computed extended ephemeris. During a positioning operation (e.g., positioning operation 244) that is different from the data refresh operation and that may occur subsequent to the data refresh operation, the device may determine satellite navigation information from the computed extended ephemeris. The extended ephemeris computation and/or the satellite navigation information determination may be performed by the processor 306, for example.

During the data refresh operation, the computed extended ephemeris may be stored in a memory in the device (e.g., memory 308). The stored computed extended ephemeris may be subsequently read from the memory during the positioning operation. The device may transition from the data refresh operation or from the positioning operation to a low-power mode of the device (e.g., low-power mode 230).

The extended ephemeris may be computed by integrating one or both of current broadcast ephemeris and historic broadcast ephemeris into an orbit model, such as a solar radiation pressure model. In this regard, the device may determine a curve fitting polynomial of the computed extended ephemeris during the data refresh operation and may store the determined curve fitting polynomial in a memory in the device during the data refresh operation.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for keeping a GPS receiver in a state that enables rapid signal acquisition.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for satellite navigation, comprising:
acquiring, by a communication device, broadcast ephemeris from a satellite signal during a data refresh operation;
computing, by the communication device, extended ephemeris from the acquired broadcast ephemeris during the data refresh operation;
determining, by the communication device, satellite navigation information from the computed extended ephemeris during a positioning operation that is different from the data refresh operation and subsequent to the data refresh operation; and
dynamically modifying, by the communication device, a time associated with a schedule of the data refresh operation based on the computed extended ephemeris.

2. The method of claim 1, further comprising:
transitioning from the data refresh operation to a low-power mode.

3. The method of claim 1, further comprising:
storing the computed extended ephemeris in a memory in the communication device during the data refresh operation; and
reading the stored computed extended ephemeris from the memory during the positioning operation.

4. The method of claim 1, wherein the satellite signal comprises: a GPS signal, a GLONASS signal, a GALILEO signal, or a combination thereof.

5. The method of claim 1, further comprising: transitioning from the positioning operation to a low-power mode of the communication device.

6. The method of claim 1, wherein the computing comprises:
computing the extended ephemeris by integrating the acquired broadcast ephemeris or previously acquired broadcast ephemeris into an orbit model.

7. The method of claim 6, wherein the orbit model comprises a solar radiation pressure model.

8. The method of claim 1, wherein the computing comprises:
determining a curve fitting polynomial of the computed extended ephemeris during the data refresh operation; and
storing the determined curve fitting polynomial during the data refresh operation.

9. The method of claim 1, wherein the computing comprises:
computing the extended ephemeris for more than one GNSS satellite during the data refresh operation.

10. A Global Navigation Satellite System (GNSS)-enabled handset, comprising:
a GNSS front-end configured to acquire broadcast ephemeris from a satellite signal during a data refresh operation; and
a processor configured to:
compute extended ephemeris from the acquired broadcast ephemeris during the data refresh operation,
determine satellite navigation information from the computed extended ephemeris during a positioning operation that is different from the data refresh operation and subsequent to the data refresh operation; and
dynamically modify a time associated with a schedule of the data refresh operation based on the computed extended ephemeris.

11. The GNSS-enabled handset of claim 10, wherein the processor is further configured to transition the GNSS-enabled handset from the data refresh operation to a low-power mode.

12. The GNSS-enabled handset of claim 10, wherein the processor is further configured to:
store the computed extended ephemeris in a memory in the GNSS-enabled handset during the data refresh operation; and
read the stored computed extended ephemeris from the memory during the positioning operation.

13. The system GNSS-enabled handset of claim 10, wherein the satellite signal comprises: a GPS signal, a GLONASS signal, a GALILEO signal, or a combination thereof.

14. The GNSS-enabled handset of claim 10, wherein the processor is further configured to transition the GNSS-enabled handset from the positioning operation to a low-power mode.

15. The GNSS-enabled handset of claim 10, wherein the processor is configured to compute the extended ephemeris by integrating the acquired broadcast ephemeris or previously acquired broadcast ephemeris into an orbit model.

16. The GNSS-enabled handset of claim 15, wherein the orbit model comprises:
a solar radiation pressure model.

17. The GNSS-enabled handset of claim 10, wherein the processor is configured to:
determine a curve fitting polynomial of the computed extended ephemeris during the data refresh operation; and
store the determined curve fitting polynomial in a memory in the GNSS-enabled handset during the data refresh operation.

18. The GNSS-enabled handset of claim 10, wherein the processor is configured to compute the extended ephemeris for more than one GNSS satellite during the data refresh operation.

19. A communication device for satellite navigation, comprising:
a front-end configured to acquire satellite ephemeris during a first mode of operation; and
a processor configured to:
compute extended satellite ephemeris from the acquired satellite ephemeris during the first mode of operation,
determine navigation information from the computed extended satellite ephemeris during a second mode of operation that is different from the first mode of operation; and
transition the communication device from the second mode of operation to the first mode of operation to re-acquire the satellite ephemeris based on the computed extended satellite ephemeris.

20. The communication device of claim 19, wherein the processor is configured to compute the extended ephemeris by integrating the acquired satellite ephemeris or previously acquired satellite ephemeris into an orbit model.

21. The communication device of claim 19, wherein the processor is configured to determine a curve fitting polynomial of the computed extended ephemeris during the first mode of operation.

* * * * *